United States Patent [19]
Putnam et al.

[11] Patent Number: 5,564,837
[45] Date of Patent: Oct. 15, 1996

[54] MAIN BEARING STRUCTURE FOR INTERNAL COMBUSTION ENGINE

[75] Inventors: Craig A. Putnam, Windsor, Canada; Gary D. Liimatta, Stratford Upon Avon, England; Bradford R. Battey, Dearborn, Mich.

[73] Assignee: Ford Motor Company, Dearborn, Mich.

[21] Appl. No.: 538,669

[22] Filed: Oct. 3, 1995

[51] Int. Cl.⁶ .................. F16C 9/02; F02F 7/00
[52] U.S. Cl. ............ 384/434; 123/195 R; 384/429
[58] Field of Search ................ 384/429, 430, 384/431, 432, 433, 434, 457; 123/195 R

[56] References Cited

U.S. PATENT DOCUMENTS

| | | | |
|---|---|---|---|
| 187,962 | 3/1877 | Cantrell | 144/354 |
| 991,722 | 5/1911 | Hourd | 403/268 |
| 2,560,413 | 7/1951 | Carlson | 384/434 |
| 3,351,365 | 11/1967 | Bickl | 403/292 |
| 3,790,236 | 2/1974 | Pierce | 384/430 |
| 3,916,596 | 11/1975 | Hawley | 403/292 |
| 4,466,401 | 8/1984 | Ogawa et al. | 123/195 R X |
| 5,299,871 | 4/1994 | Hancock | 384/429 X |

FOREIGN PATENT DOCUMENTS

| | | | |
|---|---|---|---|
| 617790 | 6/1949 | United Kingdom . | |
| 1119384 | 7/1968 | United Kingdom | 384/432 |

*Primary Examiner*—Thomas R. Hannon
*Attorney, Agent, or Firm*—Jerome R. Drouillard

[57] ABSTRACT

A main bearing structure for an internal combustion engine includes a cylinder block with main bearing bulkheads which are bored for receiving cylindrical alignment elements carried in a main bearing cap assembly. The cylindrical alignment elements and the bores formed in the cylinder block are not concentric, with the result that a majority of the cylindrical alignment elements extending into the cylinder block are in interference fit with the cylinder block itself.

13 Claims, 2 Drawing Sheets

MAIN BEARING STRUCTURE FOR INTERNAL COMBUSTION ENGINE

BACKGROUND OF THE INVENTION

1. Field of the Invention

The present invention relates to a main bearing structure for mounting a crankshaft of a reciprocating internal combustion engine.

2. Disclosure Information

During the manufacturing of the crankcase or cylinder block of an internal combustion engine, it is necessary that the main bearing caps, which mount the crankshaft of the engine be bored and finished at the same time the main bearing structure of the cylinder block is bored and finished. Accordingly, semi-finished main bearing caps and cylinder block casting are bolted together and finished either by means of a boring bar, broaching, or by some other means. Once the main bearing bores are finished, the caps must be removed and bearing inserts put in place. Typically, one bearing insert will be placed in the block in each main bearing cap facing location. Then, the crankshaft is put in contact with the main bearing shells in the cylinder block and the main bearing caps, having another set of bearing shells, are placed down upon the crankshaft. Thereafter, the main bearing caps are screwed into place. Needless to say, it is necessary that the main bearing caps and cylinder block be maintained in very precise alignment, so as to prevent problems such as premature bearing wear, bearing scuffing, overheating, and engine failure.

For many years, engines have featured cylinder blocks with deep skirt designs providing a pocketing effect for main bearing caps. This pocketing involves bringing the block-to-bearing cap mating surface down around the sides of the main bearing caps. Although this arrangement proved very satisfactory when iron main bearing caps and cylinder blocks were used, it has much less importance with the advent of aluminum cylinder blocks. With aluminum cylinder blocks, it has been increasingly known to use a ladder, or bearing beam or girdle assembly in which all of the main bearing caps are consolidated into a single ladder frame.

Although ladder frames offer the advantage of additional rigidity and noise control because they rigidly bond the main bearing caps together, it is not possible to use a pocketed type of design for the caps. Indeed, with aluminum cylinder blocks, pocketed design would perhaps not be advantageous. As a result, the ability to repeatedly install the main bearing caps upon the cylinder block has suffered.

Engine designers seeking to obtain and maintain correct alignment between main bearing caps in the form of a ladder frame used with light metal cylinder blocks have increasingly turned to the use of dowels which extend between the cylinder block and the main bearing beam assembly. Such dowels have been applied by forming concentric holes or coaxial bores in both of the mating pieces; in other words, in the cylinder block and in the main bearing beam or main bearing cap assembly. In fact, a great deal of effort has been expended to employ more than one set of dowels, perhaps as many as eight or ten for a single main bearing cap assembly, while at the same time taking great pains to achieve concentricity between the dowels and the mating holes in the cylinder block. Unfortunately, the inventors have discovered that concentric dowel location is unsatisfactory. A load deflection test was performed on a combination aluminum and nodular iron main bearing cap assembly, or bearing beam, by holding two of the transverse bulkheads or bearing caps steady and by determining the force required to laterally move other bulkheads of the bearing beam. Only a 10-pound force was required to move a bulkhead laterally by a distance of 25 microns. This demonstrated that the main bearing cap assembly is not in reality a rigid body and can benefit from multiple dowels, say eight for a V-6 engine.

The need to maintain concentricity, according to conventional thinking, of course requires very expensive tooling and processing. The present inventors have discovered, however, that by making the dowels and the mating bores off-center, a beneficial interference can be created between the dowels, which are, in a Ford Motor Company design, contained in the main bearing cap assembly, and the mating bores in an aluminum engine block. This offsetting causes an interference to be established between a majority of the dowels and their mating bores, with the result that the main bearing cap assembly may be repeatably and precisely removed from the cylinder block and replaced.

It is therefore an advantage of the present invention that an engine structure according to this invention allows cylinder blocks to be manufactured with precise, repeatable alignment between the main bearing cap assembly and the cylinder block, with the result that engine durability will be increased, reducing engine friction and wear.

Another advantage of the present invention resides in the fact that the force required to complete the engagement between a cylinder block and a main bearing cap assembly according to the present invention is less than the force required with concentric dowel arrangements.

Other advantages of the present invention will become apparent to the reader of this specification.

SUMMARY OF THE INVENTION

A main bearing structure for an internal combustion engine includes a cylinder block having a plurality of main bearing bulkheads for receiving a plurality of main bearing inserts, and a plurality of fasteners which retain a plurality of main bearing cap elements in contact with the cylinder block. A crankshaft is rotatably housed within the cylinder block and maintained in contact with the cylinder block by means of a main bearing cap assembly including a plurality of cap elements, with the cap elements being mounted to mating main bearing bulkheads, and with the cap elements having laterally disposed ends joined into a unitary beam structure. The main bearing cap assembly also has a plurality of generally cylindrical alignment elements, with at least two of the alignment elements extending between at least two of the cap elements and corresponding bores formed in a mating main bearing bulkhead.

The corresponding bores and the cylindrical alignment elements are placed so that they are not coaxial, with the axes of the bores being spaced at a distance which is less than the axial spacing of the alignment elements such that the intersections between the alignment elements and the bores are noncircular, with the intersections being located on an outboard portion of each alignment elements. Alternatively, the axes of the bores engaged by the alignment elements may be greater than the axial spacing of the alignment elements, such that the intersection between each alignment element and its mating bore is located at an inboard portion of the alignments elements.

As noted above, the intersections between the cylindrical alignment elements and the corresponding bores are noncircular and may either a line, or an arcuate surface, or perhaps other noncircular surfaces. What is important here is that the intersection is not a circular surface, such as that sought to be maintained by concentric location or coaxial location of alignment elements and the mating bores.

DETAILED DESCRIPTION OF THE PREFERRED EMBODIMENTS

Figure 1:
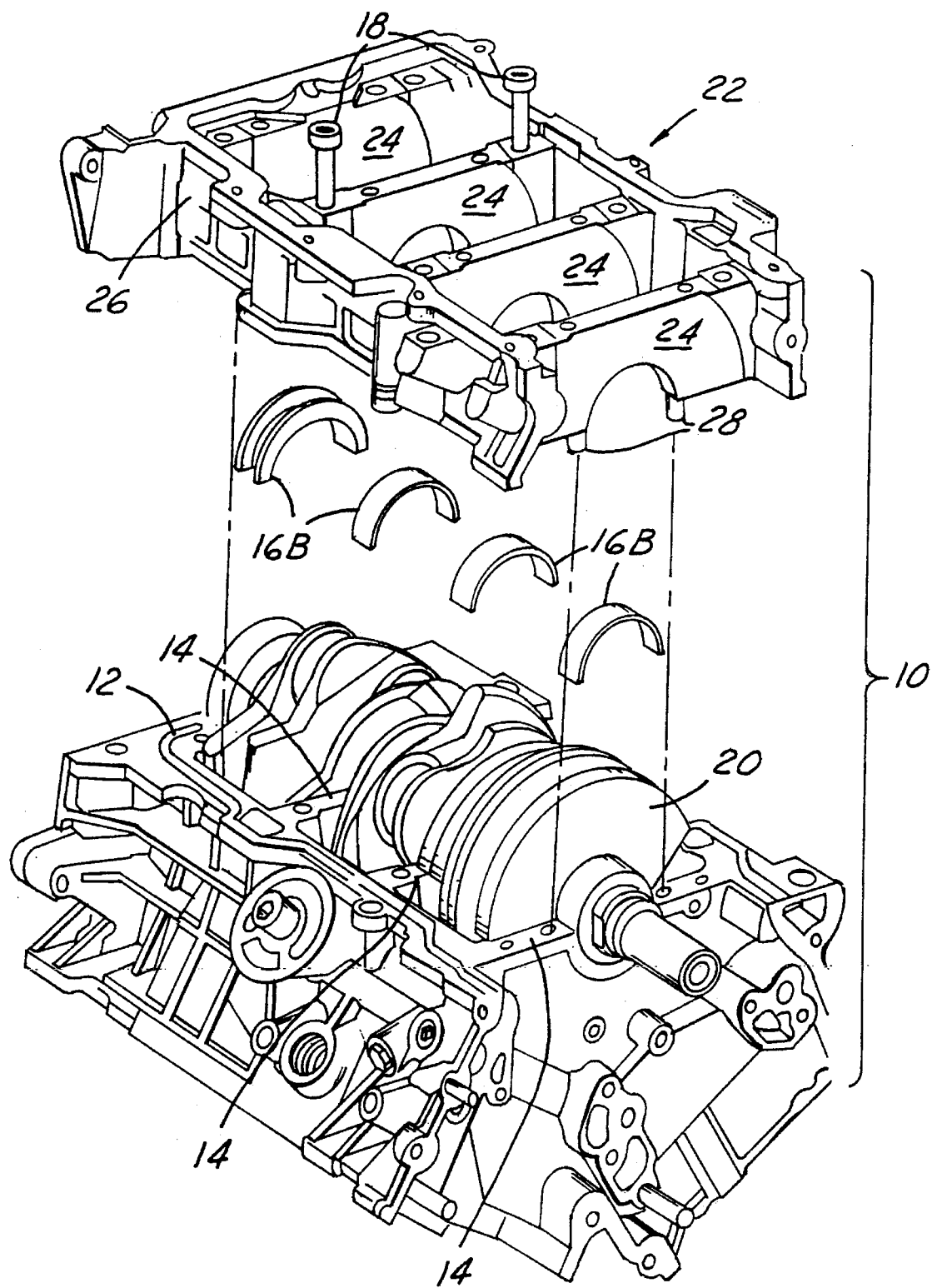
Fig. 1 is a perspective view of an engine having a main bearing structure according to the present invention.
Figure 3:
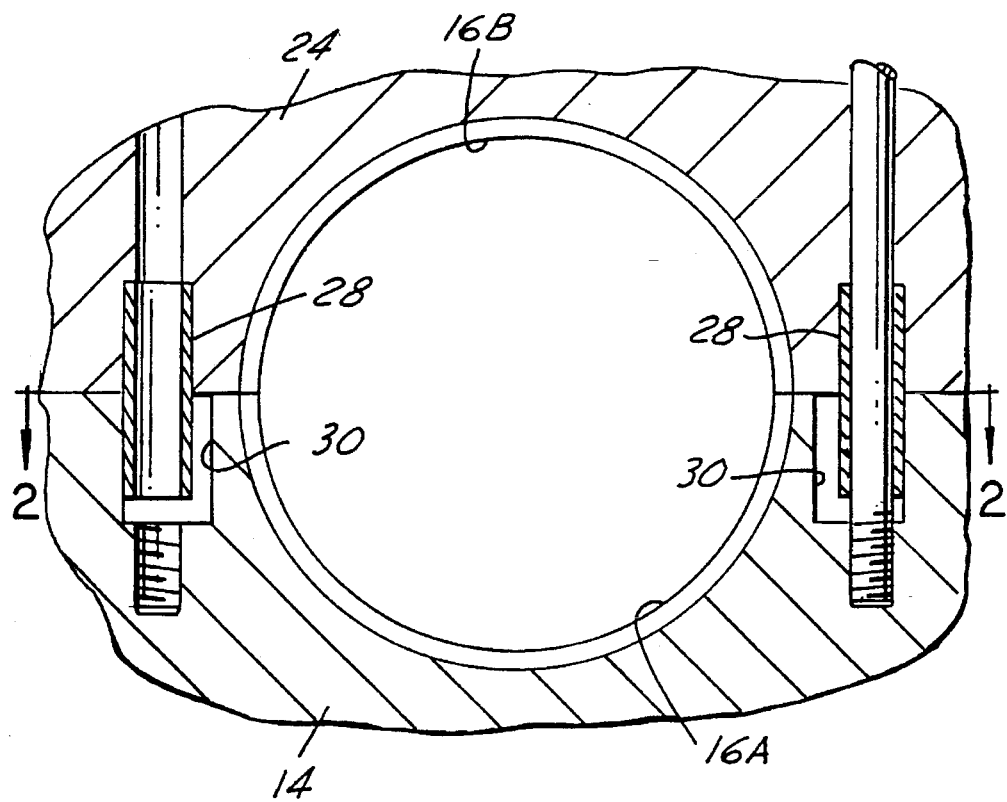
FIG. 3 is a side view of the main bearing structure of FIG. 2, taken along line 3—3 of FIG. 2.

As shown in FIG. 1, engine 10 has cylinder block 12 with a number of main bearing bulkheads 14 which extend laterally across cylinder block 12 and which form one-half of the basis for mounting engine crankshaft 20. As shown in FIG. 3, each of main bearing bulkheads 14 houses a main bearing insert 16A. Additionally, main bearing insert 16B is maintained in place by main bearing cap assembly 22, which, as shown in FIG. 1, has a plurality of cap elements 24, which in the present example are formed of nodular iron. The ends of each of cap elements 24 are captured by unitary beam structure 26, which may comprise iron, aluminum, or other metals known to those skilled in the art and suggested by this disclosure. Moreover, those skilled in the art will appreciate, in view of this disclosure, that the various metals described herein could be substituted for freely without departing from the scope of the present invention.

Figure 2:
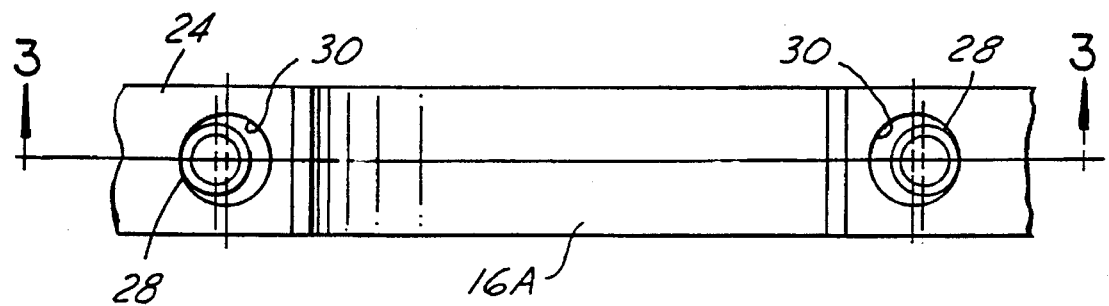
FIG. 2 is a partial plan view, cut-away, of a main bearing structure according to the present invention.

FIG. 2 illustrates one example of the contact pattern produced between dowels 28 located in main bearing cap assembly 22 and cylinder block 12 according to the present invention. A plurality of dowels 28 is pressed into main bearing cap assembly 22. In this case, two of dowels 28 are pressed into each of the cap elements, with one dowel 28 being located on each side of crankshaft 20. As shown in FIGS. 2 and 3 with particularity dowels 28, which are captured and remain in main bearing cap assembly 22 at all times during manufacturing of an engine according to the present invention, extend into corresponding bores 30 formed in main bearing bulkheads 14. Notice that the lateral separation of dowels 28 is greater than the lateral axial separation of bores 30. In other words, dowels 28 are biased to the outside of bores 30, sufficiently to produce an interference fit between dowels 28 and bores 30. As a result, the intersection in each of the dowels and each corresponding bore formed in main bearing bulkheads 14 will comprise an arcuate surface, as shown in FIG. 2, or,if the interference is less severe, the intersection may comprise but a line contact.

The inventors have produced engines, as shown in various figures, having cylinder block 12 of aluminum and cap elements 24 of nodular iron, with generally cylindrical alignment elements comprising dowels 28 being made of steel and having cap screws 18 driven therethrough for the purposes of assisting in the retention of main bearing cap assembly 22 upon cylinder block 12. With this type of structure, dowels 28 are pushed inwardly by the intersecting side walls of bores 30, and this is beneficial because the nodular iron structure of cap elements 24 is much stronger than the aluminum of the cylinder block, and this allows the heavier section of the cylinder lying outboard of the dowels 28 to withstand the compressive force of the dowels. The previously described engine used a main bearing structure having 14mm dowels, with dowels 28 being spaced at 89mm, and with bores 30 being spaced at89.054mm. With this arrangement, the majority of dowels 28 are maintained in an interference fit with their mating bores 30.

Those skilled in the art will appreciate, in view of this disclosure, that the eccentricity or offset between the axes of bores 30 and cylindrical alignments could be in either direction, or for that matter, in both directions. In other words, the bores 30 could intersect alignment elements 28 either outboard or inboard of the center lines of the particular parts being doweled together. Furthermore, those skilled in the art will appreciate, in view of this disclosure, that an alignment system according to the present invention could be used with componentry other than cylinder block main bearing caps. Also, the present system could be employed to such that at least two of the alignment elements extending between at least two of said cap elements and their corresponding bores formed in a mating main bearing bulkhead are placed so that they are not coaxial, with the axes of the bores being spaced longitudinally at a distance which is different from the longitudinal spacing of their mating alignment elements such that the intersections between the alignment elements and the bores are non-circular. This arrangement would be useful for locating the thrust surfaces of a main bearing cap assembly.

While the invention has been shown and described in its preferred embodiments, it will be clear to those skilled in the arts to which it pertains that many changes and modifications may be made thereto without departing from the scope of the invention. For example, the axes of bores 30 could be offset in both directions from alignment elements 28 in alternate directions, so that the intersections between the alignment elements and bores 30 will be located on inboard and outboard portions of the alignment elements. Further, because alignment elements are described as being generally cylindrical, dowels 28 could have an ovoid profile, or for that matter, be solid, without having a bore to permit passage of a capscrew therethrough. In any event, a structure according to the present invention is advantageous because the locating dowels in effect serve as very strong locating springs to promote and provide the desired alignment of the the component which is doweled to the cylinder block.

What is claimed is:

1. A main bearing structure for an internal combustion engine, comprising:

a cylinder block having a plurality of main bearing bulkheads for receiving a plurality of main bearing inserts and a plurality of fasteners for a plurality of main bearing cap elements;

a crankshaft which is rotatably housed within said cylinder block; and a main bearing cap assembly comprising:

a plurality of cap elements, with said cap elements being mounted to mating main bearing bulkheads, with said cap elements having laterally disposed ends joined into a unitary beam structure; and a plurality of generally cylindrical alignment elements, with at least two of said alignment elements extending between at least two of said cap elements and corresponding bores formed in a mating main bearing bulkhead, with said bores and said cylindrical alignment elements being placed so that they are not coaxial, with the axes of said bores being spaced at a distance which is less than the axial spacing of said alignment elements such that the intersections between the alignment elements and the bores are non-circular, and with said intersections being located on outboard portions of said alignment elements.

2. A main bearing structure according to claim 1, wherein the intersection between each of the cylindrical alignment elements and each corresponding bore formed in a main bearing bulkhead comprise a line.

3. A main bearing structure according to claim 1, wherein the intersection between each of the cylindrical alignment elements and each corresponding bore formed in a main bearing bulkhead comprises an arcuate surface.

4. A main bearing structure according to claim 1, wherein said cylinder block and said cap elements are both formed of metal, with the material of said cap elements having a greater yield strength than the material of said cylinder block.

5. A main bearing structure according to claim 4, wherein said cap elements are formed of nodular iron, and said cylinder block is formed of aluminum.

6. A main bearing structure according to claim 1, wherein at least one of said cylindrical alignment elements comprises a hollow dowel.

7. A main bearing structure according to claim 6, wherein said dowel has a capscrew passing coaxially therethrough for the purpose of retaining said main bearing cap assembly to said cylinder block.

8. A main bearing structure for an internal combustion engine, comprising:

a cylinder block having a plurality of main bearing bulkheads for receiving a plurality of main bearing inserts and a plurality of fasteners for a plurality of main bearing cap elements;

a crankshaft which is rotatably housed within said cylinder block; and a main bearing cap assembly comprising:

a plurality of cap elements, with said cap elements being mounted to mating main bearing bulkheads, with said cap elements having laterally disposed ends joined into a unitary beam structure; and a plurality of generally cylindrical alignment elements, with at least two of said alignment elements extending in a direction perpendicular to the axis of said crankshaft between each of said cap elements and corresponding bores formed in a mating main bearing bulkhead, with said bores and said cylindrical alignment elements being placed so that they are in interference, with the axes of said bores being laterally spaced at a distance which is greater than the lateral axial spacing of said alignment elements such that the intersection between each alignment element and its mating bore is noncircular, and with said intersection being located at an inboard portion of the alignment elements.

9. A main bearing structure according to claim 8, wherein the intersection between each of the cylindrical alignment elements and each corresponding bore formed in a main bearing bulkhead comprises a line.

10. A main bearing structure according to claim 8, wherein the intersection between each of the cylindrical alignment elements and each corresponding bore formed in a main bearing bulkhead comprises an arcuate surface.

11. A main bearing structure according to claim 8, wherein said cylinder block and said main bearing cap assembly are both formed of metal, with the material of said cylinder block having a greater yield strength than the material of said main bearing cap assembly.

12. A main bearing structure according tp claim 8, wherein at least least two of said alignment elements extending between at least two of said cap elements and their corresponding bores formed in a mating main bearing bulkhead are placed so that they are not coaxial, with the axes of said bores being spaced longitudinally at a distance which is different from the longitudinal spacing of said alignment elements such that the intersections between the alignment elements and the bores are noncircular.

13. A main bearing structure for an internal combustion engine, comprising:

a cylinder block having a plurality of main bearing bulkheads for receiving a plurality of main bearing inserts and a plurality of fasteners for a plurality of main bearing cap elements;

a crankshaft which is rotatably housed within said cylinder block; and a main bearing cap assembly comprising:

a plurality of cap elements, with said cap elements being mounted to mating main bearing bulkheads, with said cap elements having laterally disposed ends joined into a unitary beam structure; and a plurality of generally cylindrical alignment elements, with at least two of saidalignment elements extending in a direction perpendicular to the axis of said crankshaft between each of said cap elements and corresponding bores formed in a mating main bearing bulkhead, with said bores and said cylindrical alignment elements being placed so that they are not coaxial, with the axes of a first set of said bores being spaced at a distance which is greater than the axial spacing of said alignment elements, and with the axes of a second set of said bores being spaced at a distance which is less than the axial spacing of said alignment elements, such that the intersection between each alignment element and its mating bore is noncircular.

* * * * *